W. L. FRY.
AUTOMOBILE BODY.
APPLICATION FILED FEB. 16, 1917.
1,367,247.
Patented Feb. 1, 1921.
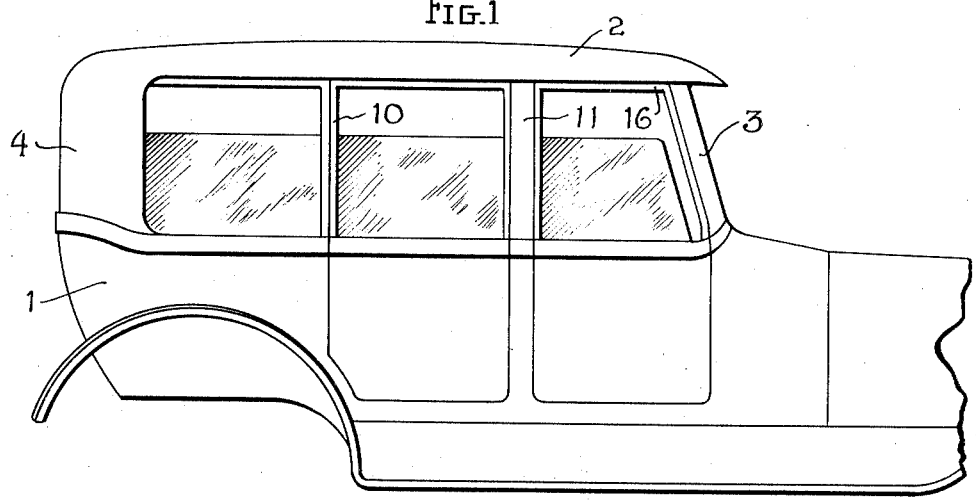
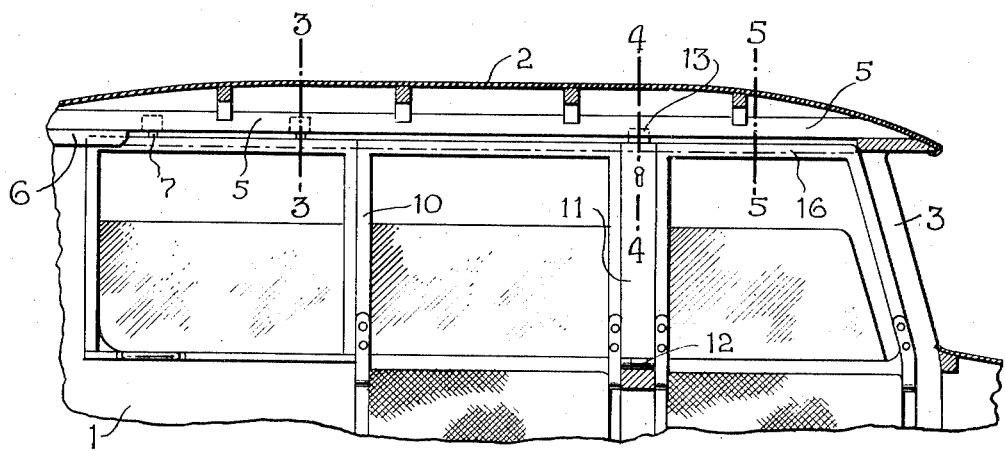
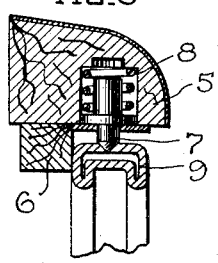
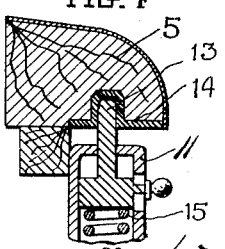
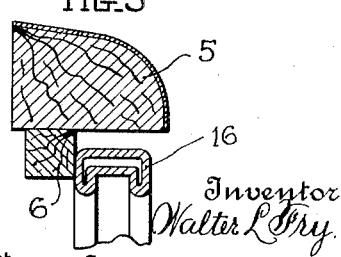
Inventor
Walter L. Fry.
By his Attorneys

UNITED STATES PATENT OFFICE.

WALTER L. FRY, OF DETROIT, MICHIGAN, ASSIGNOR, BY MESNE ASSIGNMENTS, TO EDWARD G. BUDD MANUFACTURING COMPANY, A CORPORATION OF PENNSYLVANIA.

AUTOMOBILE-BODY.

1,367,247.  Specification of Letters Patent.  Patented Feb. 1, 1921.

Application filed February 16, 1917. Serial No. 148,939.

*To all whom it may concern:*

Be it known that I, WALTER L. FRY, a citizen of the United States, a resident of the city of Detroit, county of Wayne, State of Michigan, have invented Improvements in Automobile-Bodies, of which the following is a specification.

My invention, although applicable to other vehicle bodies, has more particular reference to automobile bodies, and finds its greatest utility in automobile bodies of the convertible type, wherein windows or other side members are arranged to close an opening between the roof and main body portion of the automobile body.

I have applied my invention to automobile bodies of the "Springfield type," and find that it has a high degree of utility in such bodies.

In the operation of an automobile, torsional stresses are applied to the chassis frame, through the movement of the vehicle over an irregular road, and the raising or lowering of one wheel of a pair above or below the other wheel of the pair, incident to travel, will often cause the chassis frame of the vehicle to twist to an appreciable extent. In the case of motors mounted upon automobile chassis, this action is sometimes so severe as to cause a shearing of the motor legs or struts. It will be readily understood that if the automobile body is attached to the longitudinal members of the chassis frame, as is the common practice, the twisting movements of the frame will be transmitted to the body, thus causing a movement of the various portions of the body with respect to one another. In an open body, having no permanent roof or superstructure, such movement of the chassis frame will cause loosening of the body plates, rattling of the doors and sometimes breakage of the body frame members, but in a body of the closed type, or one having a permanent roof or superstructure upon it, these results are greatly magnified, and are likely to have much more serious consequences, unless adequate provision is made to avoid their bad effects.

My invention has for its object the construction of an automobile body having a permanent standing roof, such that certain of the bad effects of the movement of the parts of the body, relative to one another, described above and which are commonly known as "weaving," may be avoided.

In the drawings, Figure 1 is a side view of an automobile body of the "Springfield type," having a permanent roof; Fig. 2 is a sectional view thereof on a larger scale; Fig. 3 is an enlarged sectional view taken on a line 3—3 of Fig. 2; Fig. 4 is a sectional view taken on a line 4—4 of Fig. 2 and Fig. 5 is a sectional view on an enlarged scale taken on a line 5—5 of Fig. 2.

The body, as shown in the drawings, comprises a body portion 1, having permanently mounted thereon, a roof 2, which is supported by means of posts 3 at its forward end, and a back 4.

It will be seen that if one corner of the chassis frame is depressed, say for instance the right hand front corner, the post 3 nearest the observer will be carried down, bringing the corner of the roof immediately above said post down with it, and depressing the right hand front corner of the roof 2 with respect to all other portions of the roof. The roof 2, being a relatively stiff construction, the post 3 under these conditions, may be put in tension, and if a supporting member intermediate the post 3 and back 4 is provided, the roof would be brought by its downward movement, to bear upon such intermediate supporting member, thus preventing movement of the roof and increasing the strain upon post 3. If one of the front wheels be raised with respect to another and an intermeditae member between the post 3 and back 4 holds the top and body rigidly together, the post may be under compression combined with a bending stress and this may result in rupture of the post. I have found that the longer the unsupported distance of the roof between the post 3 and the back 4, the more opportunity will there be for the movements of the body to be taken up without straining post 3 unduly, and that the strain upon the post 3 is a direct function of the distance between the post 3 and the next adjacent support on the same side of the roof.

I therefore aim in my improved construction to make the unsupported length of roof as great as possible, so that the movements of the roof, caused by the weaving of the body, may be taken up without putting the posts under undue strain.

In order to accomplish this result, I arrange my body construction so that all of the vertical members extending between the roof of the body, except the posts 3 and the back 4 are flexibly connected to the roof, and are so arranged as to permit a slight movement of the roof, without being brought to bear against its underside.

As an illustration of this construction, I will show the removable and hinged members described in the copending applications of Herman C. Maise, Serial Nos. 150,372 and 151,389.

Referring to Fig. 2, it will be seen that the roof 2 is supported by a pair of longitudinal roof rails 5, each of which carries upon its underside, a window stop 6. The quarter window, illustrated in the drawings, is held in position, by pins at the lower edge of its frame entering recesses in the body portion 1, and by means of plungers 7, which are normally pushed outward by means of springs 8, against the window frame 9. With this construction there is left a space between the upper edge of the window frame 9 and the underside of the rail 5. The door construction may be that ordinarily used on "Springfield type" bodies, and may comprise a hinged window frame 10 extending to within a short distance of the roof rail 5. A hinged post 11, such as illustrated in the Maise application, Serial No. 151,389, above referred to, is mounted upon the body portion 1, by means of hinge 12, and is attached to the rail 5 by means of a bolt 13 held into a seat in casting 14, upon the underside of rail 5, by means of spring 15. The construction is such that the bolt, under the pressure of a spring, will follow the movements of the rail, without affording any support to the latter. The front window may also be hinged upon the upper edge of the door and may comprise a window frame 16 overlapping the window stop 6, but out of contact with the rail 5.

I have used the construction shown in the drawings as illustrating the principle of my invention, but it will be understood that any suitable construction of window or side member may be used, provided it is flexibly connected to the roof and is arranged so that it neither supports the roof when it is moved downwardly out of its normal position, or holds it against upward movement.

It will be understood that the specific details I have shown and described, are shown merely by way of illustration of a form of my invention I have found to possess utility, and I therefore do not wish to confine myself to these particular details, since many changes may be made without departing from the spirit of my invention.

What I claim is:

1. In a vehicle body structure of the inclosed convertible type, a body portion having longitudinally extending permanent sides, a roof permanently supported at its front and rear ends upon said body and above the permanent sides of the body portion, said roof having longitudinally extending rails at its edges, removable side members to inclose the spaces between the edges of the roof and the upper edges of the permanent body sides, and spring pressed plungers associated with said rails and the upper edges of said removable side members to retain the latter in place while permitting movement of the top rail relatively thereto.

2. In a vehicle body structure of the inclosed type, a body portion having longitudinally extending permanent sides, a roof permanently supported at its front and rear ends upon said body and above the permanent sides of the body portion, said roof having longitudinally extending rails at its edges, a stop piece carried by the under side of said rails, removable side members to inclose the spaces between the edges of the roof and the upper edges of the permanent body sides, the upper edges of said removable side members engaging laterally against said stop, and spring pressed plungers associated with said rails and the upper edges of said removable side members to retain the latter in place against said stop while permitting relative movement of the top edge rails.

3. In a vehicle body structure of the inclosed convertible type, a body portion having longitudinally extending permanent sides, a roof permanently supported at its front and rear ends upon said body and above the permanent sides of the body portion, said roof having longitudinally extending rails at its edges, removable side members to inclose the spaces between the edges of the roof and the upper edges of the permanent body sides, recesses formed in said top edge rails, and spring pressed plungers seated in said recesses and engaging the upper edges of said removable side members.

In testimony whereof, I have signed my name to this specification this thirtieth day of February, 1917.

WALTER L. FRY.